Aug. 12, 1952 C. K. POWELL 2,606,658
EGG GRADING MACHINE COMPRISING PNEUMATIC LIFTING
MEANS SUPPORTED BY SCALE BALANCE ARMS
Filed March 24, 1949 5 Sheets-Sheet 1

INVENTOR.
CHARLES K. POWELL
BY
Campbell, Brumbaugh, Free & Graves
ATTORNEYS

Aug. 12, 1952            C. K. POWELL            2,606,658
EGG GRADING MACHINE COMPRISING PNEUMATIC LIFTING
MEANS SUPPORTED BY SCALE BALANCE ARMS
Filed March 24, 1949            5 Sheets-Sheet 2
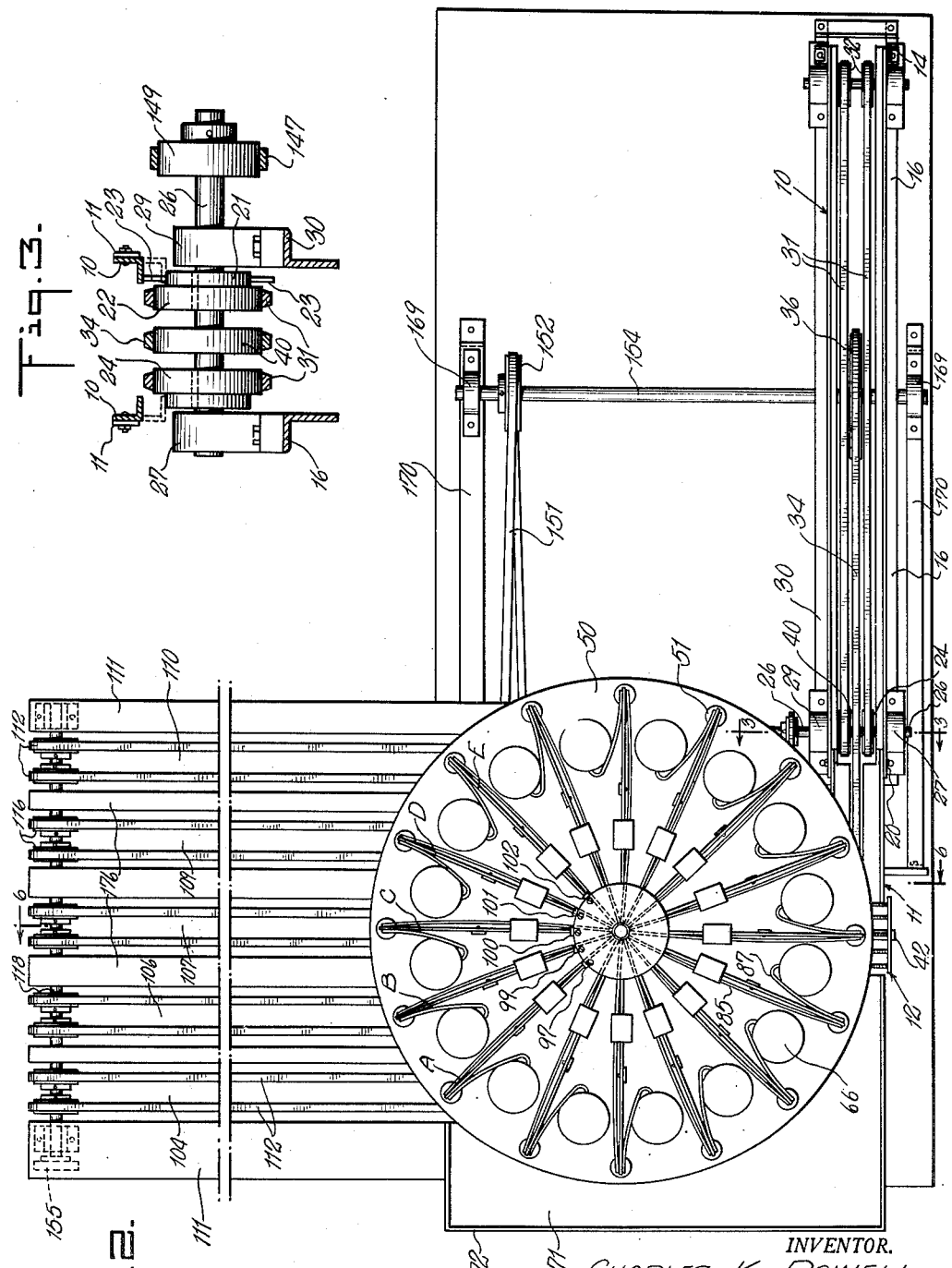
INVENTOR.
CHARLES K. POWELL
BY
Campbell, Brumbaugh, Free & Graves
ATTORNEYS

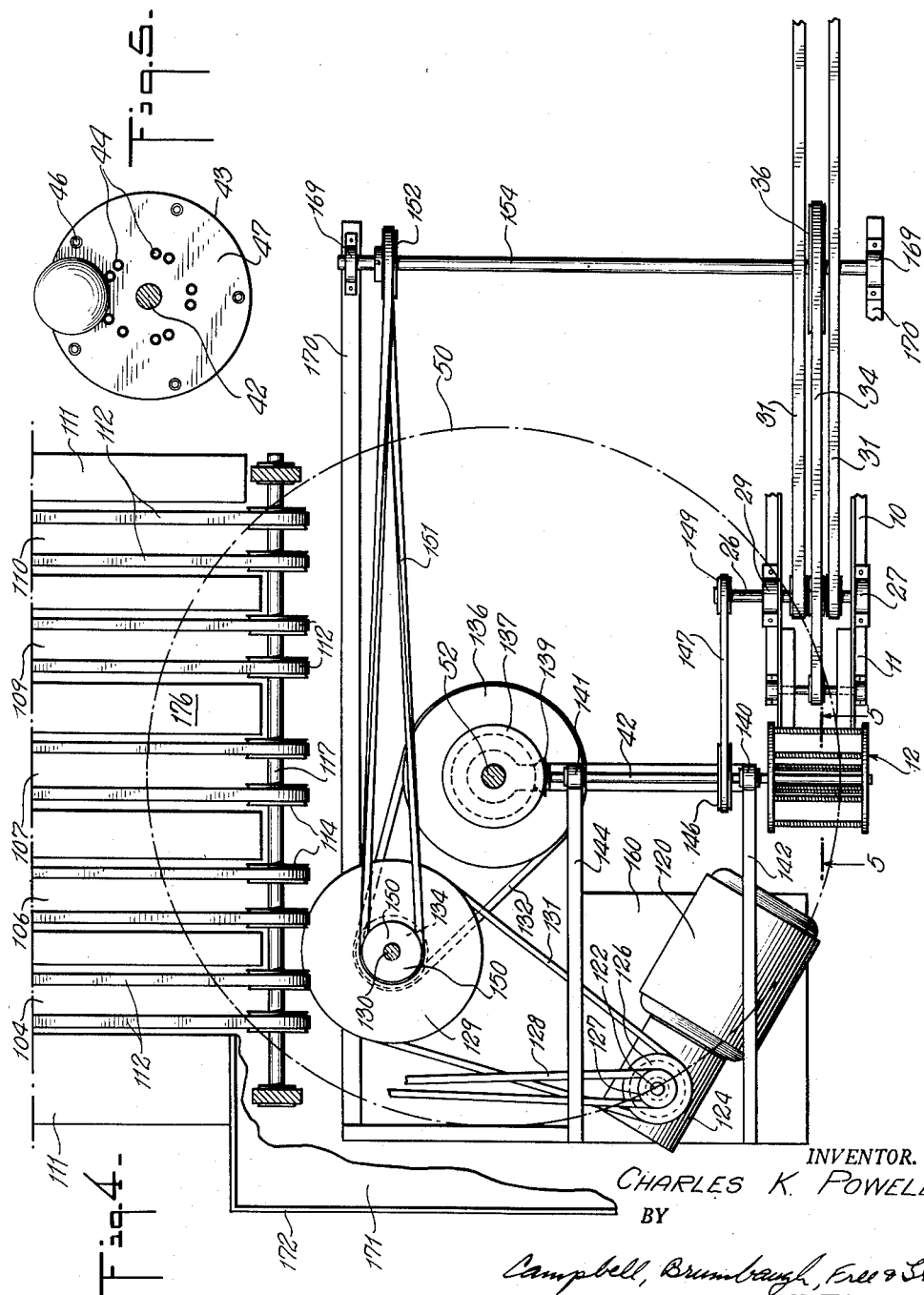

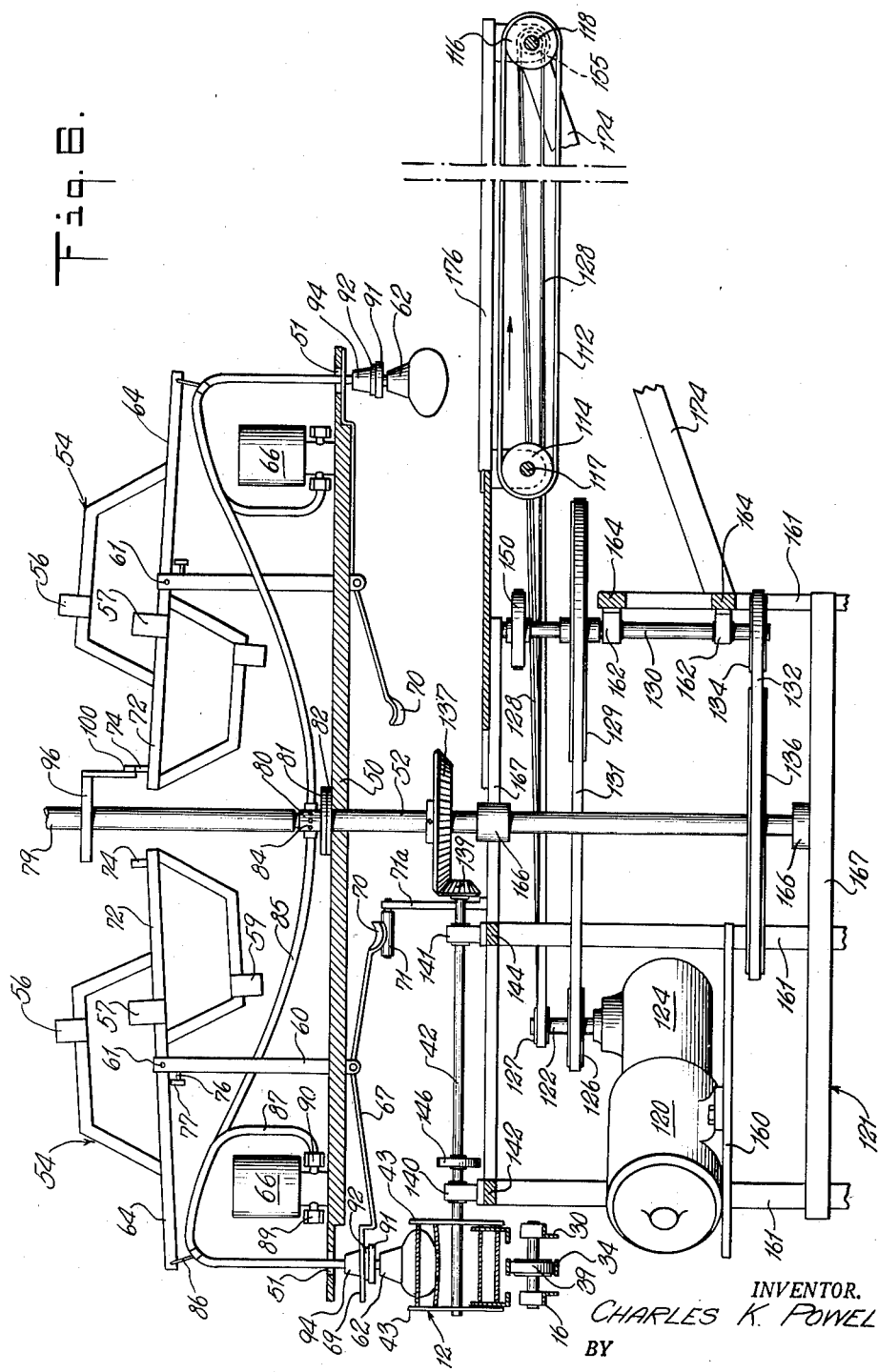

INVENTOR
CHARLES K. POWELL

Patented Aug. 12, 1952

2,606,658

UNITED STATES PATENT OFFICE 2,606,658

EGG GRADING MACHINE COMPRISING PNEUMATIC LIFTING MEANS SUPPORTED BY SCALE BALANCE ARMS

Charles K. Powell, Washington, D. C., assignor to Chestnut Farms-Chevy Chase Dairy Company, Washington, D. C., a corporation of Delaware Application March 24, 1949, Serial No. 83,279

4 Claims. (Cl. 209—121)

The present invention relates to an improved egg grading machine for automatically classifying eggs by weight. It relates also to a novel weighing assembly and to an improved mechanism for loading said weighing assembly with eggs.

The machine of this invention includes (1) a feed section, (2) a weighing section and (3) a delivery section.

The feed section, which is designed to feed eggs in seriatim to the weighing section, comprises one or more channel members for advancing the eggs, in a predetermined, aligned position, toward the weighing section and a loading member to pick the eggs up individually and cooperate in loading the eggs onto the weighing elements. In the preferred embodiment, the loading member is a rotatable wheel having a pair of spaced disks and a plurality of longitudinal, resilient members defining a plurality of pockets and spaced between the disks.

The weighing section comprises a turntable supporting a plurality of weighing assemblies, each of which includes a scale member which in turn supports an element for pneumatically lifting an egg from the loading member. In the preferred embodiment of the invention the lifting element is in the form of an inverted cup member connected to a source of sub-atmospheric pressure and the scale member is in the form of a balance arm having an outer end for supporting the cup member. Cam actuated means are provided to bring the cup members successively and individually into positive engagement with eggs on the loading member. As the turntable turns upon its axis, after a given weighing assembly has lifted an egg off the loading member, said weighing assembly assumes a position of equilibrium depending upon the weight of the egg picked up. Upon arrival over the delivery section of the machine, the weighing assembly engages one of several electrical contacts, the particular contact engaged depending upon the equilibrium position assumed by the loaded weighing mechanism, and consequently, upon the weight of the egg. As soon as such contact is made, the egg is released from the cup member to be deposited in the delivery section of the machine.

The delivery section comprises a plurality of tracks to receive the eggs released from the weighing mechanisms, one track being disposed beneath each of the egg releasing positions as determined by the disposition of the several electrical contact elements, so that eggs of different weights are classified according to weight. The delivery section preferably also includes means for removing the eggs from beneath the releasing positions so that one egg will not be dropped upon another.

The machine of this invention has a number of important advantages over machines known to have been proposed heretofore for accomplishing similar results. One such advantage is its relative simplicity of construction. Another is the positive means by which the eggs are loaded individually onto the weighing mechanism without subjecting the eggs to undue pressure. Still another advantage resides in the flexibility of the machine with reference to the number of different grades or weights of eggs that can be classified. A further advantage resides in the speed with which the machine can be operated to automatically and accurately classify eggs by weight.

A single machine, constructed in accordance with the preferred embodiment particularly described herein, has been operated successfully to classify eggs into five different weights at speeds up to 24 cases per hour.

These and other advantages, as well as the utility of the invention, will become more apparent from the following detailed description of one preferred embodiment illustrated by way of example only in the accompanying drawing wherein:

Figure 2 is a plan view of the machine illustrated in Figure 1;

Figure 3 is a detailed view, in elevation, taken along section line 3—3 of Figure 2;

Figure 4 is a schematic plan view in section taken along section line 4—4 of Figure 1;

Figure 5 is a detailed view in elevation taken along section line 5—5 of Figure 4;

Figure 6 is a schematic view taken along section line 6—6 of Figure 2; and

The various sections of the machine referred to previously will now each be described, together with driving mechanism for these sections, and the operation of the machine.

The feed section

Figure 1:
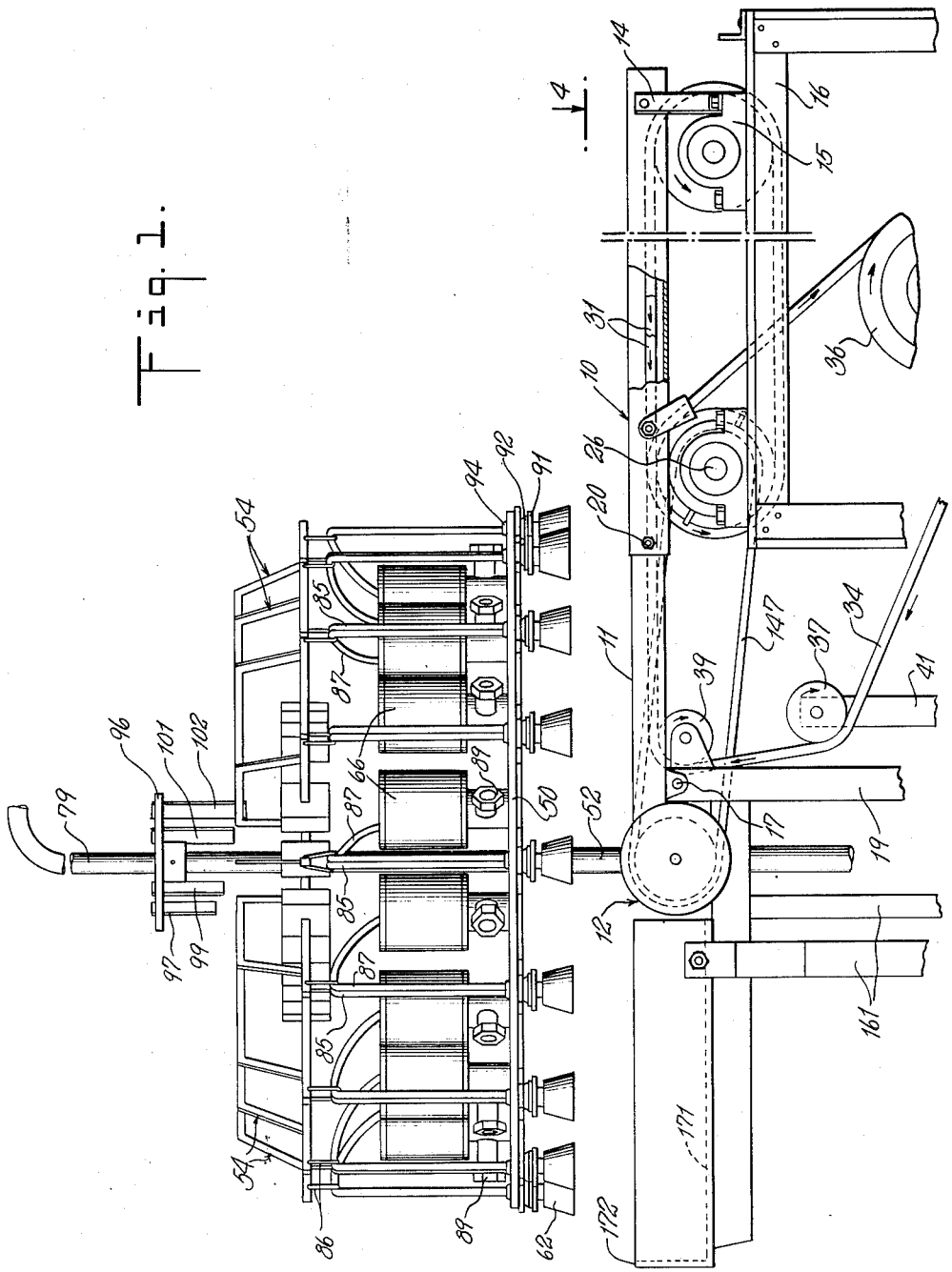
Figure 1 is a view in elevation of said preferred embodiment of the machine.

The feed section, illustrated to best advantage in Figures 1, 2 and 4, generally includes a first channel member 10, a second channel member 11 and a loading wheel 12. The first channel member 10 is pivotally supported at the rearward end by a support member 14 fastened to the base of a journal member 15 mounted on a longitudinal frame member 16. The forward end of the second channel member 11 is pivotally supported at 17 by upright 19. The forward end of the first channel member 10 and the adjoining end of the second channel member 11 are pivotally joined together by means of a pair of pins 20 and are supported by the hub 21 of pulley 22 which is provided with two set screws 23 protruding from its periphery to give the adjoining ends of channel members 10 and 11 an intermittent, upwardly jarring motion.

The pulley 22, and a similar pulley 24, are fixed to a shaft 26 supported on journals 27 and 29 mounted on longitudinal frame members 16 and 30 respectively for driving a pair of spaced and parallel A belts 31 passing over a pair of idler pulleys 32 to move the belts forwardly in the channel member 10.

A third belt 34 is provided to move rearwardly in the bottom of the second channel member 11. This belt 34 is driven by pulley 36 and is trained around idler pulleys 37, 39, and 40, pulley 40 being mounted loosely on the shaft 26 between pulleys 22 and 24 and pulley 37 being supported for rotation by an adjustable upright 41 to permit proper tensioning of the belt 34.

The loading wheel 12, illustrated in detail in Figure 5, is supported for rotation on a shaft 42 and comprises a pair of spaced disk members 43 having a plurality of longitudinal inner and outer resilient members such as coil springs 44 and 46 defining a plurality of pockets 47 between the disk members 43 of the wheel. In the preferred embodiment, as illustrated in Figures 4 and 5, the outer resilient members 46 are somewhat stiffer than the inner members 44 inasmuch as the outer members 46 are designed to position the eggs and the inner members 44 are designed to support the eggs in the pockets 47.

The weighing section

The weighing section, shown in Figures 1, 2 and 6, comprises a turntable 50 having a plurality of holes 51 and supporting a plurality of egg weighing assemblies. The table 50 is mounted for rotation on a shaft 52. Each egg weighing assembly, only two of which, for convenience of illustration, are shown in Figure 6, includes a balance arm 54 provided with one or more counterweights 56, 57 and 59 which may, if desired, be adjustable, a standard 60 mounted on the table 50 to provide a fulcrum at 61 for the balance arm, an inverted suction cup 62 supported by the outer end 64 of the balance arm, a solenoid operated air valve 66 and a lever 67 having a forked end 69 operated periodically by engagement of a cam surface 70 on its other end with a roller 71 supported by a bracket 71a secured to the frame.

The inner end 72 of the balance arm 54 is further provided with a contact plate 74 and the standard 60 supporting the balance arm is preferably provided with a threaded member 76 having an eccentric head 77 for limiting the downward motion of the outer end 64 of the balance arm due to the weight of an extraordinarily heavy egg supported by the suction cup 62.

A stationary conduit 79, connected to a source of subatmospheric pressure, is connected to a rotatable coupling 80 attached, by means of flanges 81 and 82, to the shaft 52 for supporting and rotating the turntable 50. The coupling 80 is tapped at 84 for connecting the source of subatmospheric pressure to the suction cup 62 by means of a flexible conduit or hose 85 suspended by means of straps 86 or the like from the outer end 64 of balance arm 54. A second flexible conduit or hose 87 connects the suction cup 62 with the solenoid operated air valve 66 having an air intake port 89 and an outlet port 90. A resilient spacer 91, an overlying disk 92 of relatively stiff material, and a centering cone 94 are preferably provided above cup 62 and around conduits 85 and 87.

A platform 96 is secured to the stationary conduit 79 to support a plurality of stationary electrical contact elements 97, 99, 100, 101 and 102. Said contact elements are positioned at progressively lower elevations relative to the table and define, with the weighing assemblies, a number of egg releasing positions indicated, in Figure 2, by the reference characters A, B, C, D and E applied to five balance arms 54, the contact plates 74 of which are momentarily in line with contact elements 97, 99, 100, 101 and 102, respectively.

Figure 7:
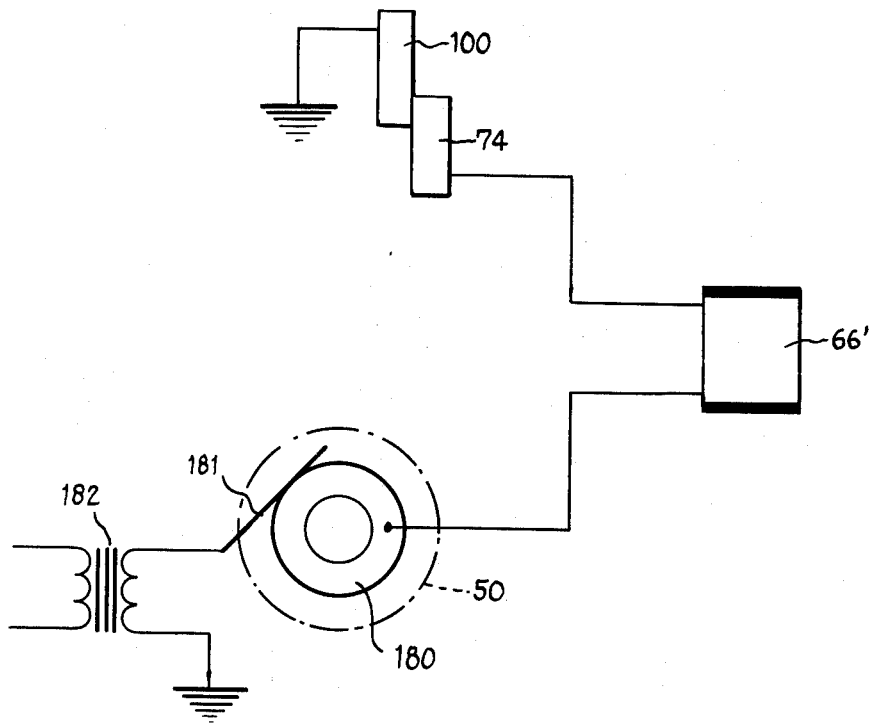
Figure 7 illustrates the electrical circuit in the weighing section.

As shown in Figure 7, one terminal of each solenoid 66' for operating an air valve 66 is connected to a source of power through a slip ring 180 revolving with table 50, shown in phantom in Figure 7, a brush 181 and transformer 182 to a source of electrical energy. The other terminal of each solenoid 66' is connected to respective contact plate 74 on the inner end 72 of the balance arm 54. The contact elements 97, 99, 100, 101 and 102 are grounded, preferably to the frame of the machine.

The delivery section

The delivery section includes a plurality of tracks 104, 106, 107, 109 and 110 supported in a frame 111 below the level of the turntable 50. Each track is provided with a pair of endless belts 112 movable forwardly, i. e., away from the turntable, over pulleys 114 and 116 rotatable on shafts 117 and 118.

The driving mechanism and frame

The power required to operate the machine may be obtained from any suitable source such as an electric motor 120 mounted on a lower portion of the frame 121. Power is transmitted from the motor 120 to a vertical shaft 122 by way of a gear box 124, the shaft 122 having fixed thereto two pulleys 126 and 127. The lower pulley 126 is connected to a pulley 129 on a vertical idler shaft 130 by means of a belt 131 and the shaft 52 of the turntable 50 is driven by means of a belt 132 connecting pulleys 134 and 136 on shafts 130 and 52, respectively. The shaft 52 for the rotatable table 50 is further provided with bevel gear 137 mating with a second bevel gear 139 on the inner end of shaft 42 for the loading wheel 12. This shaft 42, which is journalled in bearings 140 and 141 mounted on frame members 142 and 144, is in turn provided with a pulley 146 connected by means of belt 147 to a pulley 149 on the shaft 26 to drive the belts 31 in the first feed channel member 10. A third pulley 150 on the idler shaft 130 is connected by means of a belt 151 to a pulley 152 mounted on the shaft 154 to drive the pulley 36 which drives the belt 34 movable rearwardly in the second channel member 11.

The second pulley 127 on the vertical shaft 122 is connected to a pulley 155 on the shaft 118 of the delivery tray by a belt 128 to drive pulleys 116 and thereby advance belts 112 along the tracks 104, 106, 107, 109 and 110.

The frame structure may be constructed in any suitable manner as can readily be determined by those skilled in the art. Thus, for example, the electric motor 120 and gear box 124 is supported on a shelf 160 mounted on uprights 161, shaft 130 is journalled in bearings 162 secured to horizontal frame members 164 mounted on two of the uprights 161, shaft 52 is journalled in bearings 166 secured to lateral frame members 167, and shaft 154 is journalled in bearings 169 supported on bent frame members 170. A shelf 171, having a rimmed edge 172, is provided below the level of turntable 50 to catch any eggs dropped prematurely or not lifted from the loading wheel 12. A pair of support members 174 fixed to uprights 161 supports the shaft 118 which in turn supports rails 176 between each pair of carrier belts 112.

Operation

In operation a plurality of eggs placed in or otherwise conducted to the first channel member 10 are advanced toward the loading wheel 12 by the pair of spaced belts 31, the power for driving said belts being transmitted from the motor 120 by way of gear box 124, shaft 122, pulley 126, belt 131, pulley 129, idler shaft 130, pulley 134, belt 132, pulley 136, turntable shaft 52, bevel gears 137 and 139, shaft 42, pulleys 146, belt 147, pulley 149, shaft 26 and pulleys 22 and 24. Any eggs in the forward end of channel member 10 whose long axes are not already disposed transversely of the channel are moved into that position by the combined action in channel member 11, of (1) the eggs advancing from channel member 10, (2) the intermittent raising and lowering of the adjoining ends of channel members 10 and 11, and (3) the rearwardly moving belt 34 passing over idler pulleys 37, 39 and 40 and driven by driving pulley 36 on shaft 154, which in turn is driven by means of a belt 151 connecting pulley 150 on idler shaft 130 and pulley 152 on shaft 154. The intermittent jarring movement of the forward end of channel member 10 and the adjoining end of channel member 11 is due to the camming action of one or more set screws 23 protruding from the hub 21 of the pulley 22 against the bottom of one or both of said channel members.

The eggs are picked up individually from the forward end of the channel member 11 by the loading wheel 12 which is rotated in a counter-clockwise direction as seen in Figure 1. A given egg rolls into a pocket 47 of the loading wheel as defined by resilient members 44 and 46 and is carried upwardly and forwardly in said pocket by the rotation of the loading wheel, the loading wheel being turned in timed relation with the turntable 50 due to the bevel gear connection 137 and 139 between shaft 52 for the turntable and shaft 42 for the loading wheel.

At approximately the moment an egg, supported in the loading wheel 12, reaches a position directly over the shaft 42, one of the suction cups 62 supported by the turntable 50 will be positioned directly over the egg and the cam surface 70 at the inner end of the lever 67 will have become engaged by the roller 71 to depress the forked end 69 of the lever to thereby move the suction cup 62 into positive engagement with the egg. Crushing of the egg is avoided without sacrificing positive engagement thereof by the suction cup due to the resilience of the inner resilient members 44 of the loading wheel 12 and uniform application of the force applied to the suction cup by the forked end 69 of the lever 67 is assured by the relatively stiff disk member 92. As soon as positive engagement has been made, the cam surface 70 passes over and out of engagement with the roller 71 and the egg is lifted off the loading wheel 12 by the weighing assembly due to the moment applied by counterweights 56, 57 and 59 and the reduced pressure in the cup 62 due to its connection, by way of hose 85 and coupling 80, to the conduit 79 representing a source of sub-atmospheric pressure.

As the turntable 50 continues to turn on its shaft 52, the loaded weighing assembly assumes a position of equilibrium, said position being determined by the weight of the egg with which it is loaded. Thus, for example, a relatively light egg will cause the balance arm 54 to assume a position of equilibrium such that the contact plate 74 at the inner end will be relatively low. A heavier egg will cause it to assume a position at which the contact plate 74 will be higher. An oversized egg may be heavy enough to cause engagement of the balance arm 54 with the eccentric head 77 and thus result in a maximum elevation of the contact plate 74. When the turntable 50 has made approximately a half turn, the contact plate 74 on the inner end 72 of the balance arm 54 makes contact with one of the plurality of stationary electric contact elements 97, 99, 100, 101 and 102, which are arranged at progressively lower elevations relative to the turntable 50. The particular contact element with which the contact plate 74 makes contact is determined by the equilibrium position the balance arm 54 has assumed. As soon as such contact is made, the solenoid 66' operates air valve 66 to open the line 87, connected to the suction cup 62, to the atmosphere by way of valve ports 89 and 90. The resultant increase in pressure within the suction cup 62 causes the egg to be released and dropped upon one of the several pairs of endless belts 112 moving forwardly in tracks 104, 106, 107, 109 and 110 of the delivery section.

Thus, for example, if the egg is very light and the contact plate 74 is therefore at a low elevation, the contact plate will make contact with the lowermost contact element 102 to release the egg over track 110. A medium-size egg will have weight sufficient to elevate the contact plate 74 to the elevation of contact element 100. When the turntable has turned sufficiently to bring the contact plate and element into contact, the egg will be released over track 107. When contact plate 74 is raised to the maximum elevation, due to the weight of a heavy egg carried by the suction cup 62, it makes contact with the first and highest contact element 97 to release the egg over track 104.

The belts 112, which are supported by pulleys 114 and 116 mounted on shafts 117 and 118, receive their power from motor 120 by way of gear box 124, shaft 122, pulley 127, belt 128 and shaft 118, and operate to advance the eggs for further processing such as candling, packing or the like.

As soon as the egg has been released from the suction cup 62, the counterweights 56, 57 and 59 on the balance arm 54 raise the suction cup and the centering cone 94 enters the hole 51 adjacent the periphery of the turntable 50 to center the suction cup relative to said hole 51 and thereby places in the proper position for engagement with another egg when it reaches a point over loading wheel 12.

It is to be understood that numerous modifi-

What I claim is:

1. In a machine for classifying eggs by weight which includes a feed section, a weighing section, and a delivery section, a weighing section comprising a turntable, a plurality of stationary electrical contact elements, said elements being positioned at different elevations relative to the table, a plurality of egg weighing assemblies supported by the turntable, each assembly comprising a balance arm having an outer end extending substantially to the periphery of the table and an inner end carrying a contact member selectively engageable at one of several egg releasing positions with one of the electrical contact elements, means for pivotally supporting the balance arm, a resilient, inverted cup member connected to a source of sub-atmospheric pressure and supported by the outer end of the balance arm for carrying an egg from the feed section to the delivery section, cam actuated means for bringing the cup member into engagement with an egg presented for delivery by the feed section to lift the egg therefrom, and means for momentarily increasing the pressure within the cup member to release the egg when the contact member engages one of the electrical contact elements.

2. In a machine for classifying eggs by weight, the improvement which comprises an egg weighing assembly supported by a turntable, said assembly comprising a balance arm having an outer end extending substantially to the periphery of the table and an inner end carrying a contact member selectively engageable at one of several egg releasing positions with one of several electrical contact elements, means for pivotally supporting the balance arm, a resilient, inverted cup member connected to a source of sub-atmospheric pressure and supported by the outer end of the balance arm for carrying an egg from an egg feeding mechanism to a delivery section, cam actuated means for bringing the cup member into engagement with an egg on the feeding mechanism to lift the egg therefrom, and means for momentarily increasing the pressure within the cup member to release the egg to a delivery zone when the contact member selectively engages one of said several electrical contact elements.

3. In a machine for classifying eggs by weight which includes a feed section, a weighing section, and a delivery section, a weighing section comprising a turntable, a plurality of stationary control elements positioned at different elevations relative to the table, a plurality of egg weighing assemblies supported by the turntable, each assembly comprising a balance arm having an outer end extending substantially to the periphery of the table, each arm carrying an actuating member selectively engageable at one of several egg releasing positions with one of the control elements, means for pivotally supporting the balance arm, a resilient, inverted cup member connected to a source of sub-atmospheric pressure, supported by the outer end of the balance arm and suspended from above for carrying an egg from the feed section to the delivery section, cam actuated means for bringing the cup member into engagement with an egg presented for delivery by the feed section to lift the egg therefrom by suction, and means for momentarily increasing the pressure within the cup member to release the egg when the actuating member engages one of the control elements.

4. In a machine for classifying eggs by weight, the improvement which comprises an egg weighing assembly supported by a turntable, said assembly comprising a balance arm having an outer end extending substantially to the periphery of the table and carrying an actuating member selectively engageable at one of several egg releasing positions with one of several control elements, means for pivotally supporting the balance arm, a resilient, inverted cup member connected to a source of sub-atmospheric pressure, supported by the outer end of the balance arm and suspended from above for carrying an egg from an egg feeding mechanism to a delivery section, cam actuated means for bringing the cup member into engagement with an egg on the feeding mechanism to lift the egg therefrom by suction, and means for momentarily increasing the pressure within the cup member to release the egg to a delivery zone when the actuating member selectively engages one of said several control elements.

CHARLES K. POWELL.

REFERENCES CITED

The following references are of record in the file of this patent:

UNITED STATES PATENTS

| Number | Name | Date |
| --- | --- | --- |
| Re. 15,218 | Price | Nov. 1, 1921 |
| 1,984,031 | Purdy | Dec. 11, 1934 |
| 2,138,475 | Hilton | Nov. 29, 1938 |
| 2,217,983 | Hopkins | Oct. 15, 1940 |
| 2,296,645 | Marsden | Sept. 22, 1942 |
| 2,406,311 | Ashlock | Aug. 27, 1946 |
| 2,436,534 | Tolley | Feb. 24, 1948 |
| 2,451,836 | Jordan | Oct. 19, 1948 |
| 2,471,479 | Coons | May 31, 1949 |